Jan. 17, 1928.
E. BATCHELDER
INDICATOR
Filed Dec. 5, 1923 — 2 Sheets-Sheet 1
1,656,262
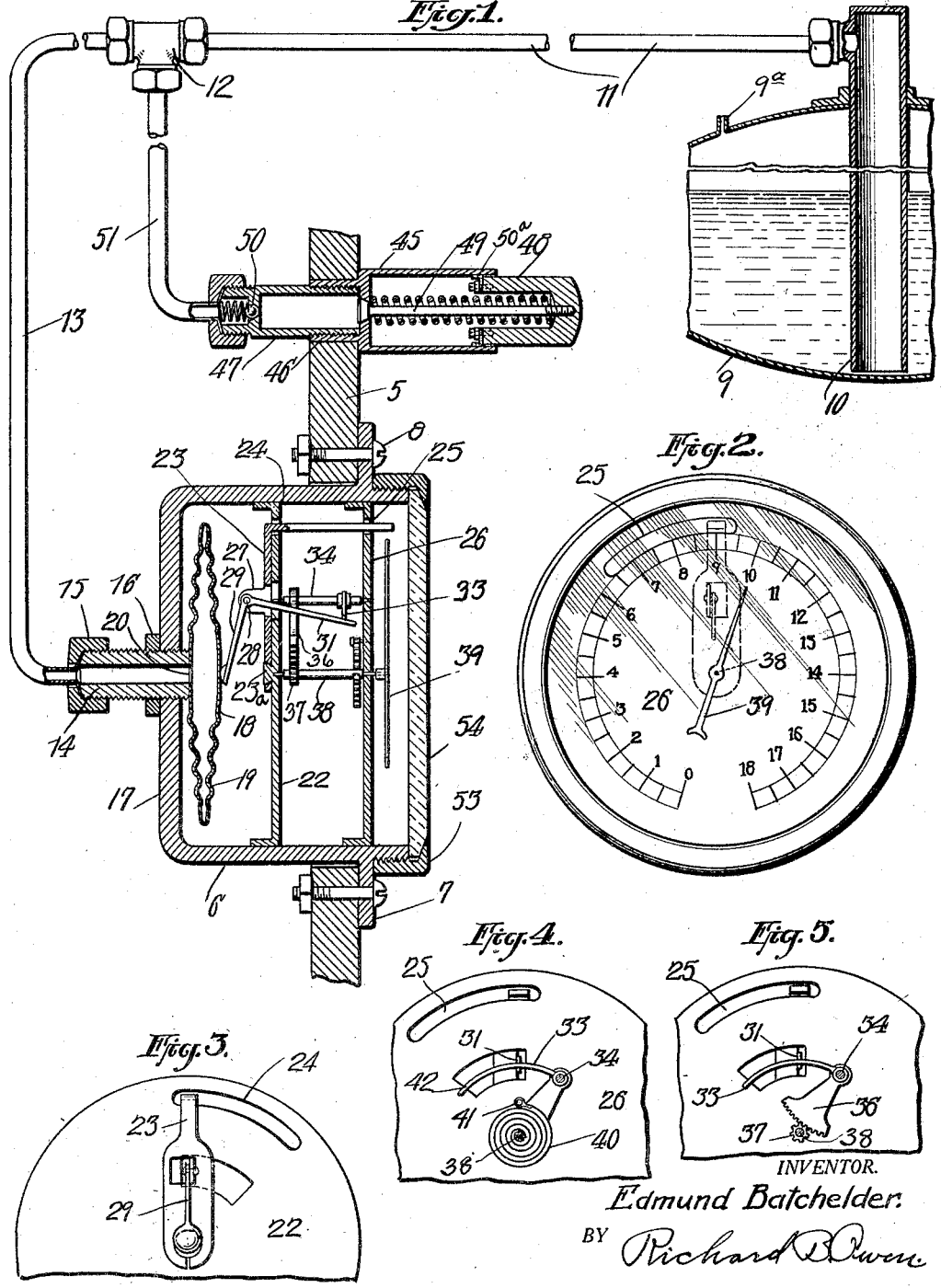
INVENTOR.
Edmund Batchelder
BY Richard Owen
ATTORNEY.

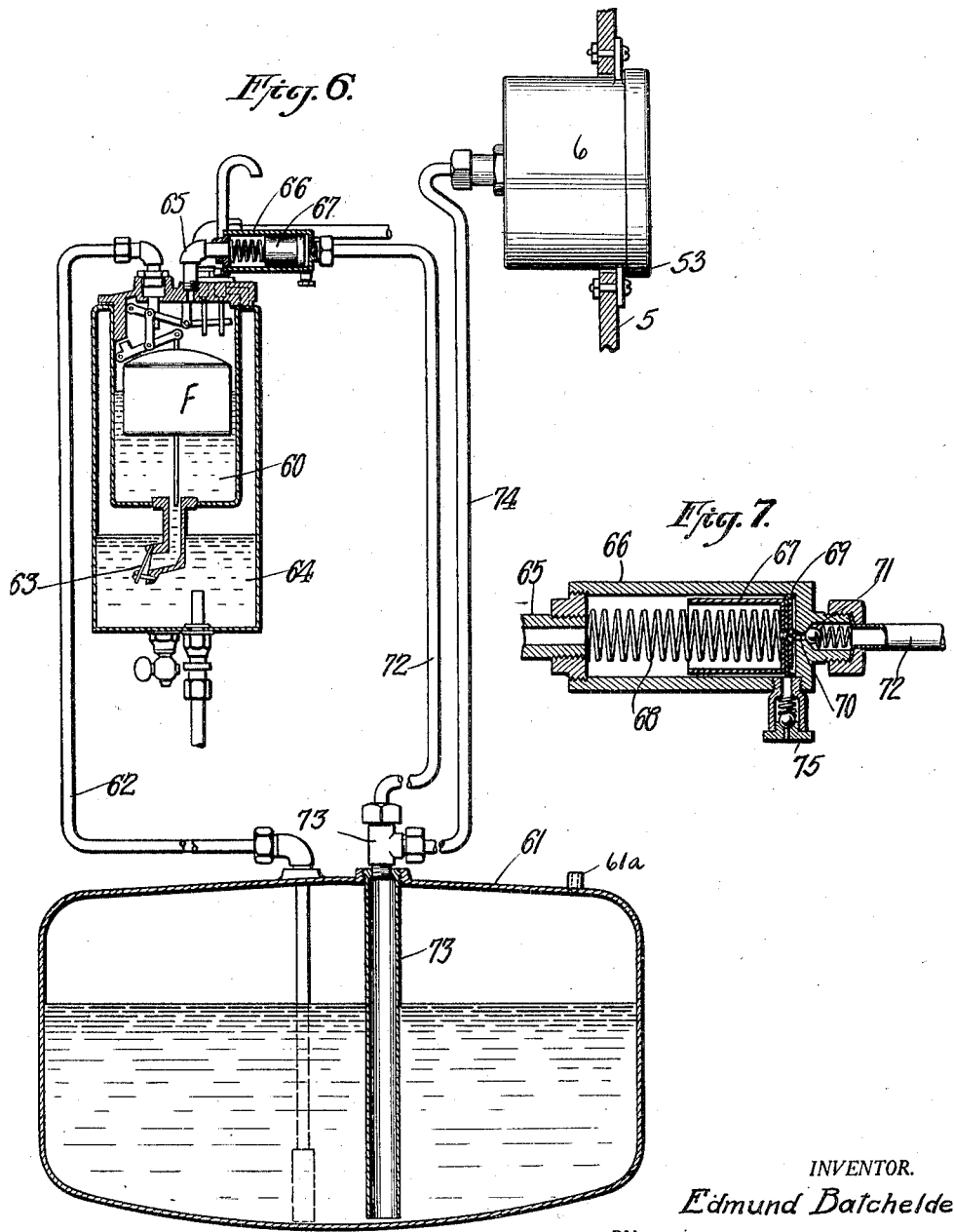

Patented Jan. 17, 1928.

1,656,262

UNITED STATES PATENT OFFICE.

EDMUND BATCHELDER, OF NEW YORK, N. Y., ASSIGNOR OF ONE-HALF TO JESSE C. FISHEL, OF BROOKLYN, NEW YORK.

INDICATOR.

Application filed December 5, 1923. Serial No. 678,763.

This invention relates to pressure gauges for tanks, boilers and analogous uses and the primary object is to provide an accurate and very sensitive gauge which can be adjusted to register the quantity of liquid in a tank by the air pressure in the gauge which is caused to be proportional to the depth of liquid.

Another object of my invention is to provide a pressure gauge including a sensitive diaphragm and an adjustable dial or indicator operating mechanism constructed and arranged so as to afford a comparatively wide range of movement without sacrificing accuracy or sensitiveness when applied to tanks or boilers of various dimensions or other devices where a reading of the various pressures is required and particularly in indicating the quantity of the liquid contents by the pressure derived from the depth of liquid within the tank.

A further object of my invention is to provide a pressure indicator having a novel and improved adjustable lever operating mechanism constructed and arranged for cooperation with a very sensitive diaphragm, including a pressure corrector or pump connected in the line between the tank and the indicating mechanism proper so as to permit forcing the liquid out of the confined pressure air chamber or pocket within said tank and thus remove any expansion or contraction incident to variation of temperature so as to give a correct and accurate reading on the indicator dial even though used on tanks of different capacity.

Another object of my invention is to provide a pressure gauge or indicating mechanism of the character above specified, particularly applicable for connection with automobile gasoline tanks of the conventional type or applicable for connection with a vacuum gasoline system such as is known in the art as "Stewart vacuum tank and gravity feed system for carburetors".

To enable others skilled in the art to so fully comprehend the underlying features of my invention that they may embody the same in the various modifications in structure and relation contemplated, drawings depicting a preferred form have been annexed as a part of this disclosure and in such drawings, similar reference characters designate corresponding parts throughout all the views, of which, Figure 1 is a vertical sectional view through the dial casing showing the mechanism and its relation to a gasoline tank of an automobile, for instance.

Figure 2 is a face view of the dial with dotted lines indicating the lever adjustment.

Figure 3 is a rear view of the lever adjuster.

Figure 4 is a view of the curved operating arm in its relation to the spring return shaft and indicator dial.

Figure 5 is a similar view of the arm and its segmental gear and pinion on the shaft.

Figure 6 is a view similar to Figure 1 showing the invention as applied to a vacuum tank gravity feed system.

Figure 7 is a detail view of a pump or pressure correcting device used in connection with the vacuum tank system and operated by the same forces.

Referring to the form of the invention and arrangement as shown by Figure 1, 5 designates the support which may be the dashboard of a motor vehicle and 6 a drum-shaped casing or housing provided with a flange 7 for attachment to the dashboard by the screws 8 or other fastening elements as shown. A tank or receptacle 9 is provided with a pressure tube 10, the latter being open at the bottom and closed at the top being secured to said tank. The tube is connected by a lead or pipe 11 near the top thereof, so that when the said tube 10 is in use within the tank, the air pressure within the tube 10 will be proportionate to the height of the liquid in the tank. The lead or pipe 11 is connected to a T-fitting 12 to which a second lead 13 is attached, the opposite end of the lead 13 being connected to a sleeve 14 by a nut 15. A locking collar 16 secures the threaded sleeve 14 in position, it being noted that the sleeve extends slightly within the interior and centrally of the rear wall 17 of the casing 6. Connected to the inner end of the sleeve 14, I have provided a flexible, hollow diaphragm 18 having a series of circular corrugations 19, said diaphragm having an opening at 20, so that the pressure within the tube 10 and the leads 11, 13, will act directly upon the interior of the diaphragm to expand and contract the same as the pressure rises and falls when liquid is introduced or withdrawn from the main tank 9.

In order to indicate the internal pressure exerted on the diaphragm, an adjustable lever operating mechanism is provided within the casing or housing 6, to which reference is now had. A flanged supporting plate 22 is positioned within the casing 6 and is provided with a central projection or head 23ª which forms a pivotal support for an adjustable L-shaped member 23, the arm of which extends at right angles through a slot 24 in the plate and through an aligned slot 25 of a front graduated dial 26. The member 23 is further provided with an outwardly struck ear 27 to which a bell crank lever 29 is pivotally connected at 28, one end of the bell crank lever 29 being adapted to contact with the diaphragm 18 at a point centrally thereof and in line with the opening 20 so that any pressure exerted will directly effect the movement of the bell crank lever. The opposite end or arm 31 of the bell crank lever 29 also extends through the plate 22 and engages the curved arm 33, mounted for partial rotation on a shaft 34, between the plate 22 and the dial 26 above referred to. It should be noted that the slot 25 and the complementary slot 24 permit the adjustment of the L-shaped member 23 about projection 23ᴬ which consequently varies the length of the effective lever arm of the curved arm 33. In other words, the adjustment of the plate 23, which carries the bell crank lever arm 31, varies the position of the bell crank lever arm 31 with respect to the axis of the curved arm 33, thus by a given movement causing the latter to be raised to different degrees for the purpose presently to appear and be described.

On the shaft 34, I have provided a toothed segment 36 which is in mesh with a pinion 37 on a second shaft 38, also held between the plate 22 and the dial 26 and concentrically thereof. The shaft 38 supports the indicator pointer 39 rotatably movable across the graduated dial 26, said shaft being returned in its movement by a coiled hair spring 40 attached thereto and to a stud 41 in the plate. Consequently any rotation imparted to the shaft 34 by the movement of the curved arm 33 will actuate the shaft 38 and the indicator pointer 39 carried thereby on the face of the dial.

While I have shown a certain graduated dial secured within the casing, I contemplate the substitution of variously graduated dials for different depths and capacity of tanks. For instance, if it is desired to install a pressure gauge of this character in an automobile having a 10 inch tank, I contemplate using a dial graduated on a scale of 10 units. However, my mechanism is so arranged that a correct and accurate reading will be had regardless of the graduations on the dial, because by adjusting the plate 23 and consequently, the leverage and movement imparted to the curved arm 33, I am enabled to attain the correct reading. If the plate 23 is adjusted so that the bell crank lever arm 31 will engage the extreme outer end 42 of the curved arm 33, it will be seen that a lesser rotation is imparted to the shafts 34, 38, and consequently will cause the indicator pointer 39 to move a lesser distance about the face of the dial than it would if the bell crank lever arm 31 were adjusted nearer the pivotal shaft 34. As the adjustment is changed so as to move the bell crank lever arm 31 toward the shaft 34, a greater rotation will be had and consequently, the pointer will move to a more distant position on the face of the dial as above described.

By reason of the loss of air due to leakage and varying volume due to changing temperatures, as by extreme heat and cold, it is necessary to correct the action of the device and consequently, I have provided a hand operated pump 45 whereby air may be forced through the pipe 51 and pipe 11 into the tube 10 so as to drive out all the liquid therein and permit of an accurate registering on the dial. Of course, some of the air will pass into the pipe 13 and will oscillate the pointer 39 back and forth but this does no harm. The mechanism to correct for the varying temperatures consists of a hand pump in the form of a cylinder 45 having a reduced internally threaded extension 46 for connection with an externally threaded sleeve 47 secured within the dashboard 5 and shown at a point adjacent the casing of the gauge. The plunger head 48 and a spring held valve 49 are positioned within the cylinder 45 so that when the plunger 48 is actuated and the valve head unseated, air will be forced into the sleeve 47 against the spring held ball valve 50 in the outer end thereof and will pass into the lead 51 and consequently to the lead 11 and tube 10, forcing before it all liquid in the tube 10 until it is emptied and the further air pumped simply passes out at the open bottom of the tube 10 and bubbles up through the liquid in the tank 9. It is evident that the pressure of the air required to empty the tube 10 is that needed to balance the column of liquid in the tank 9 above the bottom of the tube 10 and that since the same pressure in the leads affects the diaphragm 18 and its registering mechanism, the gauge will show this pressure. The fuel fluid in the tank 9 is drawn from the tank as needed and to permit this, the tank 9 is vented freely to the atmosphere at 9ª as is also the tank 61 as indicated at 61ª, Figure 6. To draw out the fuel, the outflow pipes in the vacuum system must pass down to the bottom of the tank in a self evident manner, as shown in Figure 6 and terminate preferably slightly above the bottom so as not to draw sediment or water; also to terminate on a level with the open bottom of tubes 10 or 73 so its reading will correctly indicate the fuel available for use. As the fuel level lowers, more air will bubble out and the reduced pressure show on the gauge. Pumping is not again needed until leakage or temperature variations occur. The front of the casing 6 is provided with a threaded collar 53 having a transparent panel 54 which construction is common in cases of this character.

In Figures 6 and 7 of the drawings, I have shown my invention as applied and used in a vacuum tank and gravity feed system, known in the art as the "Stewart vacuum tank and gravity feed system for carburetors". Quite briefly, the system includes the vacuum chamber 60, which draws the gasoline by suction from the main tank 61 through the lead or pipe 62 and permits the gasoline to flow past the door or flapper valve 63 to the gravity tank 64 mounted high enough to feed the carburetor by gravity, and hence through the carburetor, (not shown). The action of these "vacuum" devices is so well known, it seems unnecessary to describe it here further than to say that the interior of the tank 60 is connected to an intermittent source of suction such as the inlet manifold of an engine and that at each vacuum impulse, the liquid fuel is raised from the main tank 61 through the lead 62 and suitable check valve, (not shown), into the tank 60. During the intermission between the vacuum impulses the fuel flows out of the tank 60 through the flap check valve 63 and fills the tank 64. When this is filled to the level of the liquid of the tank 60, the action continues until the level in both tanks is so high that the float F is carried up and shuts off further flow of fuel. When the level is lowered by use, the action again starts due to the falling of the float F and the opening of the passage controlled by the float. I make use of these vacuum impulses in the tank 60 to correct and reset my depth gauge, using the mechanism now to be described.

In the head of the vacuum tank 60 is a connection 65 leading to a cylinder 66 similar to the cylinder 45 described in connection with the form shown in Figure 1. Within the cylinder 66, I have provided a plunger 67 and spring 68 to the head of which is connected or attached a packing washer 69 so that when air is drawn out of the vacuum tank, the piston 67 is drawn inwardly against the resistance of the spring 68 and is followed by air through the valve 75. When the vacuum is released, this air will be forced by spring 68 through the valve opening 70 in the head of the cylinder 66 against the spring held valve 71 at the end of the lead or pipe 72 extending to the top of the tank 61 and gauge tube 74. The tube 73 may be positioned at one corner of the tank as in Figure 1 instead of centrally as in Figure 6.

The fitting 73ª of the tube 73 provides means for connection to the pipe 74 leading to the casing of the gauge whereby the internal pressure in the tank 61, and consequently, the depth of the gasoline may be registered in the same manner as heretofore described.

It is evident that the device shown in Figures 6 and 7 will be continually corrected for variations by the continuous action of the vacuum (suction) operated pump 66. This is sometimes a matter of some importance because automobile fuel tanks are often placed at the extreme rear of the vehicle and the pipes are necessarily quite long. In a warm garage, the air expands and bubbles out giving a correct reading while doing this, but as soon as the car is taken out into cold air, the pipes are chilled contracting the air and allowing the fuel to rise in the tube 10 to replace this contraction. The tube 10 is therefore made large and the air pipes small at the gauge sections 13 and 14. This lessens the temperature fluctuations and also the pump impulses so that the gauge remains fairly steady when the pump is being used. The hand operated plunger 48 carries on its inner end a common cup 50ª which serves both as inlet valve and packing. This cup is complementary to outlet valve 50, while the valve 49 is not a check valve, being carried by the plunger 48, but serves to limit the return of the plunger 48 to its initial normal position and also to resist a leak of air from the tank 9 through valve 50, which, being lightly seated may not hold so certainly as the valve 49 with its stronger spring.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. A pressure gauge comprising a casing having an inlet and communicating with a closed reservoir or container, a flexible diaphragm within the casing and distortable by pressure from the reservoir, a stationary support within the casing, an adjustable member pivoted on the stationary support, a bell crank carried by the adjustable member and having one end contacting with the diaphragm, an indicating pointer and means operable upon the movement of the opposite end of the bell crank to actuate said pointer, and an arm on said pivoted member whereby the same can be moved to various arcuate positions.

2. A pressure gauge comprising a casing having an inlet and communicating with a closed reservoir or container, a flexible diaphragm mounted within the casing at the end of said inlet, a stationary support within the casing, an adjustable member pivotally connected centrally of said support, a bell crank lever carried by said adjustable member and having one end thereof contacting with the diaphragm, a pair of spindles mounted within the casing, a curved arm mounted on one of the spindles and engageable by the opposite end of the bell crank lever, an indicating pointer operable upon the rotation of the second spindle and gearing between the said spindles for oscillating the pointer upon the actuation of the bell crank lever.

In testimony whereof I affix my signature.

EDMUND BATCHELDER. [L. S.]